UNITED STATES PATENT OFFICE 2,441,936

IMIDAZOLONES AND METHOD OF PREPARATION

Robert Duschinsky, Essex Fells, N. J., assignor to Hoffmann-La Roche Inc., Nutley, N. J., a corporation of New Jersey No Drawing. Application March 22, 1946, Serial No. 656,528

16 Claims. (Cl. 260—309)

This invention relates to the treatment of diacyl imidazolone compounds with N-brominated-amides and N-brominated-imides, as well as to the novel products produced by this reaction.

This application is a continuation-in-part of my United States patent application Serial No. 533,396, filed April 29, 1944 (United States Patent No. 2,397,250, issued March 26, 1946), as well as a continuation-in-part of my pending United States patent application Serial No. 607,915, filed July 30, 1945, and of my pending United States patent application Serial No. 654,509, filed March 14, 1946.

My process involves in general the reaction of N-brominated-amides or N-brominated-imides with compounds of the general formula:

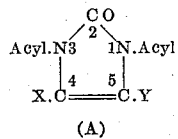

(A)

in which X is lower alkyl, and Y represents hydrogen, lower alkyl, carbalkoxyalkyl, or carbalkoxyacyl. The acyl attached to the nitrogen atoms may be a lower aliphatic radical, such as acetyl or propionyl. The lower alkyl group in position 4, represented by X, may, for example, be methyl, ethyl, or propyl. Suitable brominating agents are, e. g., N-bromosuccinimide and N-bromoacetamide.

The reaction with the brominating agent is carried out in the presence of a relatively inert organic solvent, such as carbon tetrachloride.

During the reaction, a hydrogen atom attached to a carbon in α-position to the ring nucleus in substituents X and/or Y, is replaced by a bromine atom. Thus, for example, the methyl radical is converted to bromomethyl. If there are present, attached to positions 4 and 5 two substituents X and Y having α-carbons with replaceable hydrogen atoms, the reaction can be carried out so that bromine replaces a hydrogen atom attached to either one or both of these carbon atoms in α-position to the ring nucleus.

The final products are represented by the formula:

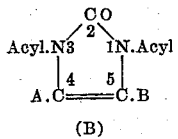

(B)

in which A represents α-bromoalkyl, and B represents hydrogen, alkyl, α-bromoalkyl, carbalkoxyalkyl, carbalkoxy-α-bromoalkyl, and carbalkoxyacyl. Wherever the designation "α" is employed herein, it will be understood to signify the carbon in alpha-position to ring carbons 4 and 5 shown in Formulae A and B.

These products, depending upon their nature, may either be isolated as relatively pure products or may remain in the reaction mixture for further treatment to prepare substitution products thereof. In this connection, it may be pointed out that the bromine in these products can be replaced by other substituents, such as acetoxy, ethoxy, mercapto, dicarbethoxymethylene, and the like, to prepare intermediates useful for organic syntheses.

Products falling within the class of novel compounds of this application may be employed as intermediates in the preparation of other organic compounds, e. g., biologically active materials such as biotin and analogs of biotin.

The following examples are illustrative of methods of carrying out my invention and of novel compounds produced by this new method. It will be understood that the products may be prepared and used either in a pure or in an impure state. It will also be evident that specific conditions of reaction, such as time, proportions, and the like may be varied depending upon the nature of the starting material and the final products desired.

EXAMPLE 1

*Diacetyl-4-bromomethylimidazolone-2*

9.1 g. of diacetyl-4-methylimidazolone-2, prepared according to Duschinsky and Dolan (J. Am. Chem. Soc., 67, 2082, (1945)), were dissolved in 30 cc. carbon tetrachloride. 8.55 g. N-bromosuccinimide were added and the mixture was refluxed for 20 minutes until potassium iodide starch paper revealed the absence of active bromine. After cooling, the succinimide was filtered off, the filtrate evaporated in vacuo, and the residue was crystallized from ether. Yield: 9.14 g. M. P. 80–81°.

EXAMPLE 2

*Diacetyl-4-methyl-5-bromomethylimidazolone-2*

Diacetyl-4,5-dimethylimidazolone-2 was prepared according to Biltz (Ber., 40, 4801 (1907)) by condensation of methyl-acetyl-carbinol with urea and acetylation of the resulting dimethylimidazolone with acetic anhydride. The diacetyl derivative (9.4 g.) was refluxed with 8.43 g. N-bromosuccinimide in 100 cc. carbon tetrachloride until disappearance of the potassium iodide starch paper reaction (about 20 minutes).

The solution, filtered from the succinimide, gave upon evaporation, crystals, which were washed with cold water. Yield: 10.46 g. colorless needles melting at 84–89°.

Example 3

*Diacetyl-4,5-dibromomethylimidazolone-2*

4.48 g. of diacetyl-4,5-dimethylimidazolone-2 and 7.08 g. N-bromo-succinimide (2 moles) were recated by refluxing in 40 cc. carbon tetrachloride. After separating the succinimide and evaporation to dryness, the product was crystallized from ether. Yield: 3.8 g. M. P. 105–110°. After recrystallization from ether containing 4 percent dioxane, the product melted at 108–110°.

Example 4

*Diacetyl-4,5-di-α-bromopropylimidazolone-2*

4,5-dipropylimidazolone-2 was prepared by a modification of the method of Basse and Klinger (Ber. 31, 1221, (1898) ). 73 g. butyroin (Organic Syntheses, Coll. vol. II, 114) and 91.2 g. urea in 380 cc. acetic acid were refluxed for 4 hours. The product crystallized after addition of 1490 cc. water, and was washed with 100 cc. of a mixture consisting of 1 volume ether and 5 volumes petroleum ether. Yield: 61.2 g. M. P. 214–219°. 16.8 g. of the foregoing dipropylimidazolone was refluxed 45 minutes with 90 cc. acetic anhydride and then evaporated to a sirup. The process of refluxing and evaporating was repeated. The final residue was crystallized from 12 cc. ethanol. Yield: 18.88 g. M. P. 57–59.5°. This is 1,3-diacetyl-4,5-dipropylimidazolone-2. 2.52 g. of the foregoing substance and 3.54 g. of N-bromosuccinimide (2 moles) were refluxed for 1¾ hours in 25 cc. carbon tetrachloride. 1.83 g. succinimide (93 percent of the theory) were obtained by filtering the cooled solution. The reaction product was obtained as an oil by evaporation of the carbon tetrachloride.

Example 5

*Diacetyl - 4 - bromomethyl - 5-imidazolone-(2)- ε-bromo-caproic acid ethyl ester*

850 mg. of diacetyl-4-methyl-5-imidazolone-(2)-caproic acid ethyl ester, (Duschinsky and Dolan, J. Am. Chem. Soc. 67, 2082 (1945) ) and 930 mg. N-bromosuccinimide were reacted in carbon tetrachloride in the manner described in Example 4. The reaction product was a slightly brownish oil.

Example 6

*Diacetyl-4-bromomethyl-5-imidazolone-(2)- ε-keto-caproic acid ethyl ester*

A solution in 165 cc. of carbon tetrachloride, of 50.7 g. diacetyl-4-methyl-5-imidazolone-(2)-ε-keto-caproic acid ethyl ester, prepared according to Duschinsky and Dolan (J. Am. Chem. Soc. 67, 2082 (1945)) was refluxed with 26.5 g. N-bromosuccinimide, until a sample of the mixture applied on moistened potassium iodide starch paper gave no iodine coloration. As a rule the reaction was completed after 40 to 60 minutes. The cooled solution, filtered from the succinimide, gave upon evaporation in vacuo a crystalline mass, which melted by warming on a water bath and poured into 150 cc. ether. Matted needles separated, which were washed with about 100 cc. ether. The yield was 56 g. M. P. 75–76.5°. The product is quite soluble in benzene, dioxane, ethyl acetate, and acetic acid; less in ether and alcohol; insoluble in petroleum ether. It can be crystallized from alcohol.

Example 7

*Diacetyl-4-bromomethyl-5-imidazolone-(2)- ε-keto-caproic acid methyl ester*

19.6 g. of 4-methyl-imidazolone-2 were reacted under the conditions described for the ethyl ester in the paper of Duschinsky and Dolan (J. Am. Chem. Soc. 67, 2082 (1945)) with 35.7 g. adipic acid mono-methyl ester chloride, and 80 g. of aluminum chloride in 110 cc. nitrobenzene. 28 g. of 4 - methyl - 5 - imidazolone-(2)-ε-keto-caproic acid methyl ester were obtained which, after recrystallization in water containing 5 percent methanol, melted at 176°. 37.9 g. of the foregoing keto ester were refluxed for 20 minutes with 165 cc. acetic anhydride and evaporated to a sirup. The process of refluxing and evaporating was repeated, the final residue was dried for ¾ hour at 100° in vacuo and crystallized from 40 cc. methanol with cooling in a dry ice acetone bath. Yield: 44.2 g. M. P. 70°. This is diacetyl-4-methyl-5-imidazolone-(2)-ε-keto-caproic acid methyl ester. 16.2 g. of the foregoing ester were refluxed for 1 hour in 95 cc. carbon tetrachloride with 8.55 g. N-bromosuccinimide. After separation of the succinimide (4.44 g.), evaporation to an oil, and addition of 50 cc. ether, the bromocompound crystallized in colorless needles melting at 58–61°. Yield: 18.5 g.

Example 8

*Dipropionyl-4-bromomethyl-5-imidazolone-(2)- ε-keto-caproic acid methyl ester*

4 - methyl - 5 - imidazolone-(2)-ε-keto-caproic acid methyl ester was prepared according to Example 7. 12 g. of the foregoing compound were refluxed twice with 50 cc. propionic acid anhydride and evaporated to dryness. The residue was crystallized from 25 cc. ether. Yield: 14.8 g. M. P. 66°. This is dipropionyl-4-methyl-5-imidazolone-(2)-ε-keto-caproic acid methyl ester. 1.68 g. of the foregoing dipropionyl-4-methyl-5-imidazolone-(2)-ε-keto-caproic acid methyl ester were reacted with 0.88 g. bromosuccinimide in 10 cc. carbon tetrachloride in the manner described in Example 6 for the diacetyl-4-methyl-5-imidazolone-(2)-ε-keto-caproic acid ethyl ester. Yield: 1.1 g. M. P. 58–61°.

It is intended that the products can be prepared and used in their various tautomeric forms. Accordingly, whenever the formula for the imidazolone nucleous and the term "imidazolone" are set forth in the specification and claims, all tautomeric forms are intended to be included therein. It will also be understood that all stereoisomers are included in the compounds disclosed and claimed herein. It is pointed out that isomers are also possible with respect to the position of the acyl groups. Thus, for example, while the specification and claims generally refer to diacyl, it will be understood that the isomeric modifications shown by the following three formulae are contemplated as being within the scope of my invention. Acetyl derivatives are shown as merely illustrative for this purpose.

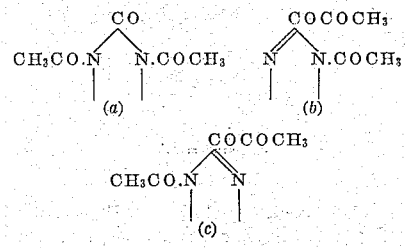

I claim:
1. Process which comprises reacting compounds of the general formula:

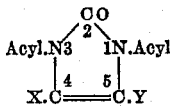

in which X is lower alkyl, and Y is a member of the group consisting of hydrogen, lower alkyl, carbalkoxyalkyl, and carbalkoxyacyl, with a compound selected from the group consisting of N-brominated amides and N-brominated imides, to produce compounds of the general formula:

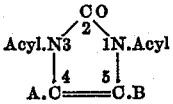

in which A represents α-bromoalkyl, and B is a member selected from the group consisting of hydrogen, alkyl, α-bromoalkyl, carbalkoxyalkyl, carbalkoxy-α-bromoalkyl, and carbalkoxyacyl.

2. Process of claim 1 in which N-bromosuccinimide is employed.
3. Process of claim 1 in which the acyl radical is acetyl.
4. Process of claim 1 in which acyl is acetyl, X is methyl, and the final product produced is substituted by bromomethyl in the 4-position.
5. The process of claim 1 in which Y represents carbalkoxyalkyl.
6. The process of claim 1 in which the process is carried out in the presence of a relatively inert organic solvent.
7. The process of claim 1 in which Y represents carbethoxyamyl.
8. The process of claim 1 in which the reaction is carried out in the presence of carbon tetrachloride as a solvent.
9. Process which comprises reacting diacetyl-4-methyl-5-imidazolone-(2)-caproic acid ethyl ester with N-bromosuccinimide in the presence of carbon tetrachloride as a solvent to obtain diacetyl-4-bromomethyl-5-imidazolone-(2)-bromo-caproic acid ethyl ester.
10. Process which comprises reacting diacetyl-4-methyl-5-imidazolone-(2)-keto-caproic acid ethyl ester with N-bromosuccinimide in the presence of carbon tetrachloride to obtain diacetyl-4-bromomethyl-5-imidazolone-(2)-keto-caproic acid ethyl ester.
11. Products of the general formula:

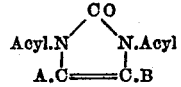

in which A is α-bromoalkyl, and B is a member of the group consisting of hydrogen, alkyl, carbalkoxyacyl, α-bromoalkyl, carbalkoxy-α-bromoalkyl, and carbalkoxyalkyl.

12. Products of claim 11 in which acyl is acetyl.
13. Products of claim 11 in which A represents bromomethyl.
14. Diacetyl-4-bromomethyl-5-imidazolone-(2)-ε-bromo-caproic acid ethyl ester.
15. Diacetyl-4-bromomethyl-5-imidazolone-(2)-ε-keto-caproic acid ethyl ester.
16. Diacetyl-4-bromomethyl-5-methylimidazolone-2.

ROBERT DUSCHINSKY.